United States Patent
Park et al.

(10) Patent No.: US 6,777,363 B2
(45) Date of Patent: Aug. 17, 2004

(54) NON-REDUCABLE, LOW TEMPERATURE DIELECTRIC CERAMIC COMPOSITION, CAPACITOR AND METHOD OF PREPARING

(75) Inventors: Hae Sung Park, Kyungki-do (KR); Kang Heon Hur, Kyungki-do (KR); Woo Sup Kim, Kyungki-do (KR); Joon Hee Kim, Kyungki-do (KR); Jong Han Kim, Kyungki-do (KR)

(73) Assignee: Samsung Electro-Mechanics Co., Ltd. (KR)

( * ) Notice: Subject to any disclaimer, the term of this patent is extended or adjusted under 35 U.S.C. 154(b) by 50 days.

(21) Appl. No.: 10/322,634

(22) Filed: Dec. 19, 2002

(65) Prior Publication Data

US 2004/0005982 A1 Jan. 8, 2004

(30) Foreign Application Priority Data

Jul. 5, 2002 (KR) .................................. 10-2002-38795
Nov. 21, 2002 (KR) .................................. 10-2002-72852

(51) Int. Cl.[7] .......................................... C03C 35/468
(52) U.S. Cl. ...................................... 501/139; 501/138
(58) Field of Search .................................. 501/137–139

(56) References Cited

U.S. PATENT DOCUMENTS 5,668,694 A  9/1997  Sato et al. ............... 361/321.4
5,862,034 A  1/1999  Sato et al. ............... 361/321.5
6,559,084 B1 * 5/2003 Fujikawa et al. ........... 501/139
6,699,809 B2 * 3/2004 Fujikawa et al. ........... 501/138

FOREIGN PATENT DOCUMENTS

JP  06-215976     8/1994
JP  2000-311828   11/2000
KR  2000-0012080  2/2000

* cited by examiner

Primary Examiner—Karl Group
(74) Attorney, Agent, or Firm—Lowe Hauptman Gilman & Berner LLP

(57) ABSTRACT

Multilayer ceramic chip capacitors which satisfy X5R (−55 to 85° C., $\Delta C=\pm 15\%$) requirements and which are compatible with reducing atmosphere sintering conditions so that base metals such as nickel and nickel alloys may be used for internal electrodes are made in accordance with the invention.

The multilayer ceramic chip capacitor comprises alternately staked, dielectric ceramic layers and internal electrode layers wherein dielectric ceramic layers comprise per 100 mol of $BaTiO_3$, $BaTiO_3$; $MgCO_3$: 0.2 to 3.0 mol; at least one selected from $Y_2O_3$, $Ho_2O_3$, $Dy_2O_3$ and $Yb_2O_3$: 0.05 to 1.5 mol; $Cr_2O_3$: 0.1 to 1.5 mol; $Ba_xCa_{(1-x)}SiO_3$ (provided that $0 \leq x \leq 1$): 0.2 to 3.0 mol; and $Mn_2V_2O_7$: 0.01 to 1.5 mol. The multilayer ceramic chip capacitor of the present invention has a high dielectric constant, satisfies X5R characteristics can be sintered at a low temperature of 1,200 to 1,250° C.

13 Claims, 1 Drawing Sheet

NON-REDUCABLE, LOW TEMPERATURE DIELECTRIC CERAMIC COMPOSITION, CAPACITOR AND METHOD OF PREPARING

BACKGROUND OF THE INVENTION

1. Field of the Invention

The present invention relates to a non-reducible dielectric ceramic composition, and more particularly to a non-reducible dielectric ceramic composition which has a high dielectric constant when sintered at a low temperature and satisfies X5R characteristics (−55 to 85° C., $\Delta C=\pm 15\%$), a multilayer ceramic chip capacitor using the composition and a method for preparing the multilayer ceramic chip capacitor.

2. Description of the Related Art

Multilayer ceramic chip capacitors are widely used as electronic parts featuring a small size, high capacitance and high reliability, with a number of such capacitors being employed in one electronic device. In the recent drive toward small-size, high-performance devices, there is an increasing requirement to develop multilayer ceramic chip capacitors of smaller size, higher capacitance, lower cost, and higher reliability. The multilayer ceramic chip capacitors are generally manufactured by alternately stacking dielectric layers and internal electrode layers, followed by sintering.

Palladium or palladium alloys have generally been used as the conductor of an internal electrode. Recently, use of relatively inexpensive base metals such as nickel or nickel alloys as the conductor of an internal electrode has increased. In the event that base metals are used as the conductor of an internal electrode, the internal electrodes may be oxidized upon being sintered in air. Therefore, co-sintering of dielectric layers and internal electrode layers must be effected in a reducing atmosphere. However, sintering in a reducing atmosphere causes the dielectric layers to be reduced, resulting in a lower resistivity. Non-reducible dielectric ceramic materials were thus proposed.

However, multilayer dielectric ceramic chip capacitors using non-reducible dielectric ceramic materials have a remarkably deteriorated insulation resistance (IR) when an electric field is applied. That is, they have problems including a short lifetime of IR and low reliability. When the dielectric materials are subject to a direct current electric field, there arises another problem that their dielectric constant ($\epsilon_r$) is reduced with time. If thinner dielectric ceramic layers are used in order to provide chip capacitors of a smaller size and greater capacitance, application of direct current voltage across the capacitors causes the dielectric ceramic layers to receive a stronger electric field, resulting in a greater change of dielectric constant $\epsilon_r$ with time (that is, a greater change of capacitance with time). Capacitors are also required to have an excellent temperature characteristic of capacitance (TCC). Capacitors used for particular purposes are required to have a stable temperature characteristic of capacitance under severe conditions. Exemplary temperature-compensating dielectric ceramic materials which are excellent in a temperature characteristic of capacitance are compositions of $(Sr, Ca)(Ti, Zr)O_3$, $Ca(Ti, Zr)O_3$, $Nd_2O_3-2TiO_2$, and $La_2O_3-2TiO_2$. However, these materials have a very low dielectric constant (generally, 100 or less) and thus cannot be used in preparing capacitors with a high capacitance.

A composition having $BaTiO_3$ as a major component with $Nb_2O_5$—$Co_3O_4$, MgO—Y, a rare earth element (Dy, Ho, etc.), $BaTiO_3$—$TiO_2$, etc. added is disclosed, which has a high dielectric constant and a fixed temperature characteristic of capacitance. However, the dielectric ceramic composition including $BaTiO_3$ as a major component fails to satisfy XR characteristics ($\Delta C=\pm 15\%$) at a high temperature, because a Curie temperature of $BaTiO_3$ is about 130° C.

Exemplary dielectric ceramic compositions with $BaTiO_3$ as a major component are disclosed in U.S. Pat. No. 5,668,694; U.S. Pat. No. 5,862,034; Japanese Patent Application Laid-Open Publication No. 6-215979; Japanese Patent Application Laid-Open Publication No. 2000-311828 and Korean Patent Application Laid-Open Publication No. 2000-0012080.

U.S. Pat. Nos. 5,668,694 and 5,862,034 disclose a multilayer ceramic chip capacitor that contains $BaTiO_3$ as a major component and MgO, $Y_2O_3$, BaO, CaO, $SiO_2$, MnO, $V_2O_5$, and $MoO_3$ as minor components in such a proportion that there are present MgO: 0.1 to 3 mol, $Y_2O_3$: 0 to 5 mol, BaO+CaO: 2 to 12 mol, $SiO_2$: 2 to 12 mol, MnO: 0 to 0.5 mol, $V_2O_5$: 0 to 0.3 mol, $MoO_3$: 0 to 0.3 mol, and $V_2O_5$+$MoO_3$: more than 0 mol, per 100 mol of $BaTiO_3$. This capacitor satisfies X7R characteristics but has disadvantages in that its dielectric constant is as low as 2,600 and it must be sintered at a high temperature of 1,300° C.

Japanese Patent Application Laid-Open Publication No. 6-215979 discloses a dielectric ceramic composition which comprises, $BaTiO_3$: 86.32 to 97.64 mol, $Y_2O_3$: 0.01 to 10.00 mol, MgO: 0.01 to 10.0 mol, $V_2O_5$: 0.001 to 0.200 mol, at least one selected from MnO, $Cr_2O_3$ and $Co_2O_3$: 0.01 to 1.0 mol, and $Ba_xCa(1-x)SiO_3$ (provided that $0 \leq x \leq 1$): 0.5 to 10 mol. This dielectric composition has a dielectric constant of 2,560 to 3,850 and satisfies X7R characteristics, but has a sintering temperature of as high as 1,300 to 1,380° C.

Japanese Patent Application Laid-Open Publication No. 2000-311828 discloses a dielectric ceramic composition which comprises, $BaTiO_3$: 100 mol, at least one selected from MgO and CaO: 0.1 to 3 mol, MnO: 0.05 to 1.0 mol, $Y_2O_3$: 0.1 to 5 mol, $V_2O_5$: 0.1 to 3 mol and $Ba_xCa(1-x)SiO_3$ (provided that $0 \leq x \leq 1$): 2 to 12 mol. This dielectric composition satisfies X7R characteristics, but has a dielectric constant of less than 3,000 and a sintering temperature of as high as 1,270° C.

Korean Patent Application Laid-Open Publication No. 2000-0012080 discloses a dielectric ceramic composition which comprises, per 100 mol of $BaTiO_3$ as a major component, $Cr_2O_3$: 0.1 to 3 mol, $V_2O_5$: 0.01 to 0.5 mol, an oxide of R1 (R1: Y, Ho or Dy): 0.7 to 7 mol and MnO: 0.5 or less. This dielectric composition has a dielectric constant of 1,473 to 3,086 and satisfies X8R characteristics (−55 to 150° C., $\Delta C=\pm 15\%$) but is required to have a sintering temperature of as high as 1,280 to 1,300° C.

These $BaTiO_3$-based dielectric ceramic compositions satisfy X7R characteristics (—55 to 125° C., $\Delta C=\pm 15\%$) stipulated under the EIA standard but have a low dielectric constant. Especially, in the case that a dielectric constant is 3,000, a sintering temperature is too high, for example, 1,300° C. or more. If the sintering temperature is as high as 1,300° C., an internal electrode layer shrinks at a lower temperature than a dielectric ceramic layer, thereby interfacial delamination of the two layers occurring. Furthermore, at higher sintering temperatures, lumping or break between internal electrode layers frequently occurs, thereby the reduction of capacitance and the short circuit between internal electrodes being liable to occur.

SUMMARY OF THE INVENTION

Therefore, the present invention has been made in view of the above problems, and it is an object of the present invention to provide a dielectric ceramic composition which has a high dielectric constant even at a low sintering temperature, satisfies X5R characteristics (−55 to 85° C., ΔC=±15%), can be sintered under a reducing atmosphere and shows a long lifetime of IR. Another object of the invention is to provide a multilayer ceramic chip capacitor using the composition and a method for preparing the multilayer ceramic chip capacitor.

In accordance with one aspect of the present invention, the above and other objects can be accomplished by providing a dielectric ceramic composition which comprises, $BaTiO_3$; $MgCO_3$: 0.2 to 3.0 mol; at least one selected from $Y_2O_3$, $Ho_2O_3$, $Dy_2O_3$ and $Yb_2O_3$: 0.05 to 1.5 mol; $Cr_2O_3$: 0.1 to 1.5 mol; $Ba_xCa(1-x)SiO_3$ (provided that $0 \leq x \leq 1$): 0.2 to 3.0 mol; and $Mn_2V_2O_7$: 0.01 to 1.5 mol, per 100 mol of $BaTiO_3$.

In accordance with another aspect of the present invention, there is provided a multilayer ceramic chip capacitor comprising alternately staked, dielectric ceramic layers with the above dielectric ceramic composition and internal electrode layers.

In accordance with yet another aspect of the present invention, there is provided a method for preparing the multilayer ceramic chip capacitor, comprising the steps of calcining MnO and $V_2O_5$ at a temperature of 650 to 800° C. to obtain $Mn_2V_2O_7$ in the form of powder; mixing $BaTiO_3$, $MgCO_3$: 0.2 to 3.0 mol, at least one selected from $Y_2O_3$, $Ho_2O_3$, $Dy_2O_3$ and $Yb_2O_3$: 0.05 to 1.5 mol, $Cr_2O_3$: 0.1 to 1.5 mol, $Ba_xCa(1-x)SiO_3$ (provided that $0 \leq x \leq 1$): 0.2 to 3.0 mol, and $Mn_2V_2O_7$: 0.01 to 1.5 mol, per 100 mol of $BaTiO_3$, to obtain dielectric material; alternately stacking the dielectric material and internal electrode to obtain laminated body; and sintering laminated body.

BRIEF DESCRIPTION OF THE DRAWINGS

The above and other objects, features and other advantages of the present invention will be more clearly understood from the following detailed description taken in conjunction with the accompanying drawing, in which.

DESCRIPTION OF THE PREFERRED EMBODIMENTS

Figure 1:
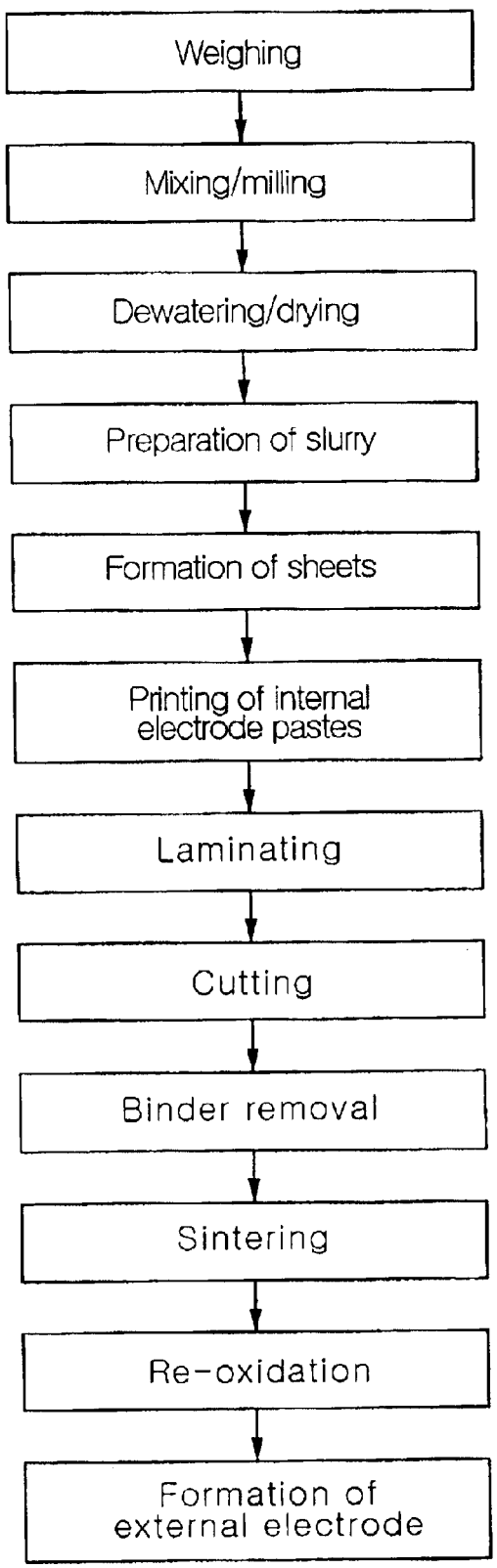
FIG. 1 is a block diagram showing one embodiment of a method for preparing a multilayer ceramic chip capacitor.

Hereinafter, the present invention will be described in more detail.

Generally, the amount of $Ba_xCa(1-x)SiO_3$ (hereinafter, simply referred to as "BCG") must be increased in order to lower the sintering temperature of $BaTiO_3$-based dielectric ceramic compositions. If the amount of the BCG is increased, however, a dielectric constant is lowered.

Therefore, after conducting research to accomplish a low temperature sintering simultaneously with ensuring a high dielectric constant using $Mn_2V_2O_7$ as a sintering aid, the present inventors found that if BCG and $Mn_2V_2O_7$ are used in combination, $BaTiO_3$-based dielectric compositions can be sintered at a low temperature. In accordance with the present invention, the amount of BCG is lowered, and at the same time, a high dielectric constant of 3,000 or more is obtained.

Most $BaTiO_3$-based dielectric ceramic compositions that have been developed until now utilize MnO and $V_2O_5$ individually. No $BaTiO_3$-based dielectric ceramic compositions containing $Mn_2V_2O_7$ synthesized from MnO and $V_2O_5$ are known. $BaTiO_3$-based dielectric ceramic compositions containing $Mn_2V_2O_7$ can be sintered at a low temperature but it is difficult to anticipate this effect where MnO and $V_2O_5$ are used individually. In case of $BaTiO_3$-based dielectric ceramic compositions disclosed in U.S. Pat. No. 5,668,694; U.S. Pat. No. 5,862,034; Japanese Patent Application Laid-Open Publication No. 6-215979; Japanese Patent Application Laid-Open Publication No. 2000-311828 and Korean Patent Application Laid-Open Publication No. 2000-0012080 as mentioned above, MnO and $V_2O_5$ were used individually and the dielectric compositions were sintered at a high temperature of 1,300° C.

Described below are the dielectric ceramic compositions of the present invention, taking into consideration the action of $Mn_2V_2O_7$ as a sintering aid and the synergistic action of $Mn_2V_2O_7$ with BCG in $BaTiO_3$-based dielectric ceramic compositions.

$MgCO_3$: 0.2 to 3 mol $MgCO_3$ serves to improve non-reducibility of dielectric ceramic compositions. And it is preferable to limit the amount of $MgCO_3$ to a range of 0.2 to 3.0 mol per 100 mol of $BaTiO_3$. If the amount of $MgCO_3$ is less than 0.2 mol, a dielectric loss factor is increased and rate of change in capacitance with temperature is larger. If it exceeds 3.0 mol, an accelerated insulation resistance lifetime is shortened and sinterability is reduced.

At Least One Selected from $Y_2O_3$, $Ho_2O_3$, $Dy2O_3$ and $Yb_2O_3$: 0.05 to 1.5 mol $Y_2O_3$, $Ho_2O_3$, $Dy_2O_3$ and $Yb_2O_3$ are effective for improving IR and IR lifetime and reducing rate of change in capacitance with temperature, resulting from their substitution for $TiO_3^{2-}$ at $Ba^{2+}$ sites. Therefore, at least one selected from $Y_2O_3$, $Ho_2O_3$, $Dy_2O_3$ and $Yb_2O_3$ is preferably added in an amount of at least 0.05 mol. If it exceeds 1.5 mol, sinterability is reduced and dielectric ceramic compositions are converted into semiconductors.

$Cr_2O_3$: 0.1 to 1.5 mol $Cr_2O_3$ is effective for improving non-reducibility. If the amount of $Cr_2O_3$ is less than 0.1 mol, dielectric ceramic compositions are converted into semiconductors, while if it exceeds 1.5 mol, IR is lowered.

$Ba_xCa(1-x)SiO_3$ (Provided that $0 \leq x \leq 1$): 0.2 to 3.0 Mol $Ba_xCa(1-x)SiO_3$ acts as a sintering aid due to its low melting point and its good reactivity with the main component. If the amount of BCG is less than 0.2 mol, sinterability is reduced, a temperature characteristic of capacitance fails to meet standards, and IR is lowered. If the amount of BCG exceeds 3.0 mol, IR lifetime is shortened and dielectric constant is lowered. It is more preferable to limit the amount of BCG to a range of 0.2 to 1.4 mol. In accordance with the present invention, the addition of $Mn_2V_2O_7$ contributes to reducing the amount of BCG. In $Ba_xCa(1-x)SiO_3$, X is 0 to 1, preferably 0.3 to 0.6.

$Mn_2V_2O_7$: 0.01 to 1.5 Mol $Mn_2V_2O_7$ has a low melting point of 820° C. and thus acts as a second sintering aid. Therefore, $Mn_2V_2O_7$ is effective for improving the sinterability of dielectric ceramic compositions. That is, the presence of $Mn_2V_2O_7$ makes it possible for dielectric ceramic compositions to be sintered at a low temperature (1,200 to 1,250° C.). As a result, a difference in shrinkage rate between internal electrode layers and dielectric ceramic layers is reduced. Therefore, disadvantages of high temperature sintering, for example, delamination, lumping and break can be solved. Furthermore, low temperature sintering prevents excessive sintering and reduces the grain size of dielectric ceramic layers, thereby higher reliability being obtained. The addition of $Mn_2V_2O_7$ contributes to reducing the amount of BCG, thereby obtaining higher capacitance. $Mn_2V_2O_7$ also enable to a stable temperature characteristic of capacitance at above the Curie temperature and extends IR lifetime. $Mn_2V_2O_7$ has more uniform distribution than when MnO and $V_2O_5$ are individually present due to its low melting point. Therefore, even a small amount of $Mn_2V_2O_7$ imparts such advantages as mentioned above. That is, when MnO and $V_2O_5$ are individually present, they are individually present in the form of solid phase due to their high melting point while, when a melting point of dielectric ceramic composition is lowered due to the two components synthesis, they are uniformly distributed in the form of liquid phase upon being sintered at a low temperature.

If the amount of $Mn_2V_2O_7$ is less than 0.01 mol, its effectiveness as a sintering aid is insufficient, while if it exceeds 1.5 mol, IR is lowered and a temperature characteristic of capacitance is adversely affected. $Mn_2V_2O_7$ is more preferably added in an amount of 0.01 to 1 mol.

In accordance with the present invention, in the case that the total amount of $BaxCa(1-x)SiO_3$ and $Mn_2V_2O_7$ is 1 to 1.6 mol, characteristics such as a dielectric constant are excellent even upon sintering dielectric ceramic compositions at a low temperature.

Next, the multilayer ceramic chip capacitor of the present invention will be described.

The multilayer ceramic chip capacitor of the present invention comprising alternately staked, dielectric ceramic layers with the dielectric ceramic composition as described above, and internal electrode layers. Base metals can be used as internal electrode materials because the dielectric ceramic composition of the present invention is non-reducible. Base metals may be those used conventionally. Base metals such as Ni or Ni alloys are preferable as the internal electrode materials.

The multilayer ceramic chip capacitor of the present invention has a high dielectric constant and satisfies X5R characteristics (−55 to 85° C., ΔC=±15%) where it is prepared using the dielectric ceramic composition of the present invention. Furthermore, a change of capacitance with time is reduced under direct current electric field and insulation resistance lifetime is increased.

Next, the method for preparing the multilayer ceramic chip capacitor of the present invention will be described in more detail.

Multilayer ceramic chip capacitor can be prepared by a conventional printing or sheeting method.

First, MnO and $V_2O_5$ are calcined at a temperature of 650 to 800° C. to obtain $Mn_2V_2O_7$ in the form of powder. The calcining temperature preferably ranges from 650 to 680° C. If the calcining temperature is less than 650° C., the phase synthesis reaction does not occur. While, if it exceeds 800° C., the grain size of the $Mn_2V_2O_7$ powder is increased and hardened, thereby milling is difficult. Therefore, MnO and $V_2O_5$ must be heat treated at proper temperature for phase synthesis in order to facilitate the milling. To this, the calcining temperature is 650 to 800° C., preferably 650 to 680° C.

After $Mn_2V_2O_7$ powder is obtained, raw materials in the form of powder are mixed to obtain a slurry. That is, $BaTiO_3$, $MgCO_3$: 0.2 to 3.0 mol, at least one selected from $Y_2O_3$, $Ho_2O_3$, $Dy_2O_3$ and $Yb_2O_3$: 0.05 to 1.5 mol, $Cr_2O_3$: 0.1 to 1.5 mol, $BaxCa(1-x)SiO_3$ (provided that $0 \leq x \leq 1$): 0.2 to 3.0 mol, and $Mn_2V_2O_7$: 0.01 to 1.5 mol, per 100 mol of $BaTiO_3$ are mixed, milled, dewatered and dried (in accordance with the present invention, the preferable addition amount of each of the BCG and $Mn_2V_2O_7$ is as mentioned above). A binder and an organic solvent are added to the dried powder to obtain a slurry.

Where a printing method is employed, the slurry and internal electrode layer-forming paste are alternately printed onto a substrate, cut to a predetermined shape and separated from the substrate. Where a sheeting method is employed, green sheets are formed from the slurry, internal electrode layer-forming pastes are printed on the respective green sheets, and the printed green sheets are laminated.

The laminated bodies are subject to removing binder and sintering at a reducing atmosphere. In this case, the sintering is carried out at a temperature of less than 1,300° C., preferably at a low temperature of 1,200 to 1,250° C. The dielectric ceramic composition of the present invention can be sintered at a low temperature. Therefore, even when sintering is carried out at a low temperature such as 1,200 to 1,250° C., capacitors with a high dielectric constant and satisfying X5R characteristics can be obtained.

External electrode layer-forming pastes are applied on end faces of the obtained sintered bodies and heat treated to obtain multilayer ceramic chip capacitors. The external electrodes are not particularly limited and Ni, Cu or their alloys can be used.

Hereinafter, the present invention will be described in more detail by way of the non-limiting examples.

EXAMPLES

According to the manufacturing process of FIG. 1, multilayer ceramic chip capacitors were prepared.

First, $BaCO_3$ and $TiO_2$ as starting raw materials were mixed in a molar ratio of 1 to 1 and reacted at 900 to 1,200° C. to obtain $BaTiO_3$. $BaTiO_3$ thus obtained was milled into $BaTiO_3$ powder of a grain size of 0.8 to 1.2 μm.

$BaTiO_3$, $MgCO_3$, $Y_2O_3$ and $Cr_2O_3$ powder, and BCG and $Mn_2V_2O_7$ powder as sintering aids were weighed and mixed. The BCG was obtained by calcining $BaCO_3$, $CaCO_3$ and $SiO_2$ powder at 1,000° C. or more for 2 hours. $Mn_2V_2O_7$ was obtained by calcining MnO and $V_2O_5$ at 650 to 680° C. for 2 hours. The sintering aids thus obtained were used after being milled to a grain size of 1.0 μm or less.

The weighed powders were wet mixed, milled, dewatered and dried.

An organic binder obtained by dissolving a binder in an organic solvent was added to the dried powders and mixed to obtain a slurry. No particular limitation is imposed on the binder. Polyvinylbutyl-based binder was used in the examples of the present invention. The slurry was applied on films by the doctor blade method to form dielectric ceramic composition sheets of 8 μm thickness.

Ni pastes as an internal electrode material were printed onto the formed dielectric ceramic composition sheets. 15 sheets thus printed were laminated and protective dummy sheets were applied to the top and bottom faces of said sheets under the pressure to form laminates.

After the laminates were cut to a 3.2×1.6 mm size depending on an internal electrode pattern, the binder was removed from the cut laminated at 200 to 350° C. for 10 hours or more. The binder-removed laminates were sintered at 1,200 to 1,250° C., for 2 hours and re-oxidized at 700 to 1,000° C.

The sintered bodies were subjected to polishing to thereby expose ends of the internal electrodes. Subsequently, conductive pastes consisting of Cu, glass frit and vehicle were applied on the end faces of the sintered bodies, dried and heat treated at 700 to 800° C. to form external electrodes in order to obtain multilayer ceramic chip capacitors. Finally, Sn—Pb on Ni coating layers were formed on the external electrodes by electroplating.

The sample capacitors prepared as the above were evaluated for electric properties such as electric constant ($\epsilon_r$) dielectric loss (tan δ), resistivity (Ω·m), and temperature characteristic of electrostatic capacitance(TCC(%)) and the results are presented in Table 2 below.

The electric constant ($\epsilon_r$) and dielectric loss (tan δ) were measured at 1 KHz, room temperature (25° C.). The resistivity (Ω·m) was obtained from IR value measured after applying a current at 250 V for 60 seconds. The temperature characteristic of electrostatic capacitance (TCC(%)) was evaluated as the percent change of the capacitance at each temperature relative to the standard electrostatic capacitance at 25° C., i.e., TCC (%)=[(CT-C25° C.)/C25° C.]×100.

TABLE 1

| Sample | BaTiO$_3$ | MgCO$_3$ | Y$_2$O$_3$ | Yb$_2$O$_3$ | Ho$_2$O$_3$ | Dy$_2$O$_3$ | Cr2O3 | BCG | Mn2V2O7 |
|---|---|---|---|---|---|---|---|---|---|
| Inv. 1 | 100 | 1.10 | 0.50 | — | — | — | 0.12 | 1.10 | 0.084 |
| Inv. 2 | 100 | 1.10 | 0.50 | — | — | — | 0.12 | 1.10 | 0.105 |
| Comp. 1 | 100 | 0.10 | 0.50 | — | — | — | 0.12 | 1.10 | 0.105 |
| Comp. 2 | 100 | 4.00 | 0.50 | — | — | — | 0.12 | 1.10 | 0.105 |
| Inv. 3 | 100 | 1.10 | 0.50 | — | — | — | 0.12 | 1.40 | 0.084 |
| Inv. 4 | 100 | 1.10 | 0.50 | — | — | — | 0.12 | 1.40 | 0.105 |
| Comp. 3 | 100 | 1.80 | 0.01 | — | — | — | 0.12 | 1.40 | 0.084 |
| Comp. 4 | 100 | 1.80 | 3.00 | — | — | — | 0.12 | 1.40 | 0.084 |
| Inv. 5 | 100 | 2.10 | 0.50 | — | — | — | 0.12 | 1.10 | 0.084 |
| Inv. 6 | 100 | 2.10 | 0.50 | — | — | — | 0.12 | 1.10 | 0.105 |
| Comp. 5 | 100 | 1.80 | 0.50 | — | — | — | 0.01 | 1.10 | 0.105 |
| Comp. 6 | 100 | 1.80 | 0.50 | — | — | — | 2.00 | 1.10 | 0.105 |
| Inv. 7 | 100 | 2.10 | 0.50 | — | — | — | 0.12 | 1.40 | 0.084 |
| Inv. 8 | 100 | 2.10 | 0.50 | — | — | — | 0.12 | 1.40 | 0.105 |
| Comp. 7 | 100 | 1.80 | 0.50 | — | — | — | 0.12 | 0.10 | 0.105 |
| Comp. 8 | 100 | 1.80 | 0.50 | — | — | — | 0.12 | 4.00 | 0.105 |
| Inv. 9 | 100 | 1.80 | 0.30 | — | — | — | 0.12 | 1.10 | 0.084 |
| Inv. 10 | 100 | 1.80 | 0.30 | — | — | — | 0.12 | 1.10 | 0.105 |
| Comp. 9 | 100 | 1.80 | 0.50 | — | — | — | 0.12 | 1.10 | 0.005 |
| Comp. 10 | 100 | 1.80 | 0.50 | — | — | — | 0.12 | 1.10 | 3.00 |
| Inv. 11 | 100 | 1.80 | 0.30 | — | — | — | 0.12 | 1.10 | 0.126 |
| Inv. 12 | 100 | 1.80 | 0.30 | — | — | — | 0.12 | 1.10 | 0.150 |
| Inv. 13 | 100 | 1.10 | 0.40 | 0.30 | — | — | 0.12 | 1.10 | 0.105 |
| Inv. 14 | 100 | 1.10 | 0.40 | 0.20 | — | — | 0.12 | 1.10 | 0.105 |
| Inv. 15 | 100 | 1.80 | 0.30 | 0.40 | — | — | 0.12 | 1.10 | 0.105 |
| Inv. 16 | 100 | 1.10 | 0.40 | — | 0.20 | — | 0.12 | 1.10 | 0.105 |
| Inv. 17 | 100 | 1.80 | 0.30 | — | 0.30 | — | 0.12 | 1.10 | 0.105 |
| Inv. 18 | 100 | 1.10 | 0.40 | — | — | 0.20 | 0.12 | 1.10 | 0.105 |
| Inv. 19 | 100 | 1.80 | 0.30 | — | — | 0.30 | 0.12 | 1.10 | 0.105 |
| Inv. 20 | 100 | 1.80 | 0.50 | — | — | — | 0.12 | 0.80 | 0.400 |
| Inv. 21 | 100 | 1.80 | 0.50 | — | — | — | 0.12 | 0.70 | 0.500 |

Inv.: Inventive;
Comp.: Comparative

TABLE 2

| Sample | Dielectric constant ($\epsilon_r$) | Dielectric loss (tanδ) | Resistivity (Ω · m) | TCC (%) −55° C. | TCC (%) 85° C. | TCC (%) 125° C. | Sintering density (g/cm$^3$) | Remark |
|---|---|---|---|---|---|---|---|---|
| Inv. 1 | 4085 | 3.25 | 2.13E+09 | −5.20 | −13.78 | −22.50 | 5.92 | Good |
| Inv. 2 | 3947 | 4.02 | 2.61E+09 | −0.21 | −12.45 | −27.11 | 5.91 | Good |
| Comp. 1 | 4085 | 8.75 | 2.13E+09 | −5.20 | −19.78 | −32.12 | 5.89 | A |
| Comp. 2 | 3247 | 5.02 | 2.61E+08 | −0.21 | −13.45 | −22.11 | 5.74 | B |
| Inv. 3 | 4157 | 3.74 | 9.75E+08 | −0.72 | −13.69 | −27.20 | 5.92 | Good |
| Inv. 4 | 4359 | 4.15 | 2.54E+09 | −2.46 | −12.52 | −29.85 | 5.90 | Good |
| Comp. 3 | 4322 | 4.74 | 9.75E+07 | −0.72 | −14.69 | −27.20 | 5.91 | C |
| Comp. 4 | | | Conversion into semiconductor | | | | | |
| Inv. 5 | 4022 | 3.27 | 4.05E+08 | −0.99 | −11.96 | −29.25 | 5.93 | Good |
| Inv. 6 | 3957 | 3.77 | 3.96E+08 | −3.21 | −12.19 | −23.11 | 5.91 | Good |
| Comp. 5 | | | Conversion into semiconductor | | | | | |
| Comp. 6 | 3557 | 3.77 | 8.96E+07 | −3.21 | −13.19 | −23.11 | 5.90 | C |
| Inv. 7 | 4129 | 2.93 | 1.29E+09 | −2.28 | −13.42 | −23.20 | 5.91 | Good |
| Inv. 8 | 3807 | 2.87 | 3.02E+08 | −5.46 | −13.63 | −25.85 | 5.90 | Good |
| Comp. 7 | 4129 | 5.93 | 1.29E+08 | −6.28 | −18.42 | −29.20 | 5.75 | B |
| Comp. 8 | 2607 | 2.87 | 3.02E+08 | −5.46 | −14.63 | −25.85 | 5.91 | D |
| Inv. 9 | 4374 | 2.02 | 5.38E+08 | −2.25 | −14.90 | −24.71 | 5.92 | Good |
| Inv. 10 | 4323 | 2.93 | 1.94E+08 | −1.28 | −15.02 | −25.20 | 5.92 | Good |
| Comp. 9 | 4074 | 8.02 | 5.38E+08 | −3.99 | −17.50 | −25.41 | 5.89 | A |
| Comp. 10 | 3823 | 3.93 | 1.94E+07 | −2.28 | −17.40 | −25.50 | 5.92 | C |
| Inv. 11 | 4316 | 3.88 | 1.04E+09 | −5.46 | −15.10 | −28.15 | 5.90 | Good |

TABLE 2-continued

| Sample | Dielectric constant ($\epsilon_r$) | Dielectric loss (tan δ) | Resistivity (Ω·m) | TCC (%) −55° C. | TCC (%) 85° C. | TCC (%) 125° C. | Sintering density (g/cm³) | Remark |
|---|---|---|---|---|---|---|---|---|
| Inv. 12 | 4311 | 2.83 | 2.16E+09 | −3.99 | −14.20 | −28.35 | 5.91 | Good |
| Inv. 13 | 4112 | 3.82 | 1.16E+09 | −1.39 | −11.99 | −25.35 | 5.92 | Good |
| Inv. 14 | 4103 | 3.91 | 1.96E+09 | −1.79 | −12.20 | −26.13 | 5.91 | Good |
| Inv. 15 | 4209 | 3.98 | 1.33E+09 | −2.99 | −13.63 | −26.26 | 5.91 | Good |
| Inv. 16 | 4121 | 3.85 | 1.03E+09 | −1.97 | −12.79 | −27.56 | 5.90 | Good |
| Inv. 17 | 4089 | 3.77 | 1.54E+09 | −1.86 | −13.56 | −26.97 | 5.90 | Good |
| Inv. 18 | 4133 | 4.05 | 1.05E+09 | −2.09 | −11.63 | −24.34 | 5.91 | Good |
| Inv. 19 | 4194 | 4.11 | 1.17E+09 | −2.43 | −12.21 | −25.26 | 5.92 | Good |
| Inv. 20 | 4291 | 4.12 | 1.76E+09 | −2.69 | −14.45 | −27.34 | 5.92 | Good |
| Inv. 21 | 4302 | 4.06 | 1.82E+09 | −3.66 | −14.87 | −28.96 | 5.91 | Good |

A: increase of tan δ; B: not sintered; C: decrease of IR; D: decrease of dielectric constant; E: temperature characteristic of capacitance at a high temperature is out of standard range.

As shown in Table 1 and Table 2, in the case that the amount of BCG was small but $Mn_2V_2O_7$ as a second sintering aid was added, the dielectric ceramic compositions of the present invention had excellent sinterability when being sintered at a low temperature.

The dielectric ceramic compositions of the present invention had dielectric constant of about 4,000, satisfied X5R characteristics and could be sintered at a low temperature. Therefore, delamination between internal electrode layers and dielectric ceramic layers did not occur and lumping and break between the internal electrode layers were reduced. Furthermore, excessive sintering was prevented and the crystal grain size of the dielectric layers was decreased, thereby reliability being improved.

As apparent from the above description, the present invention provides a dielectric ceramic composition which has a high dielectric constant and satisfies X5R characteristics (−55 to 85° C., ΔC=±15%) stipulated under the EIA standard. Furthermore, it can be sintered at a low temperature under a reducing atmosphere and has a long insulation resistance lifetime. Use of the dielectric ceramic composition of the present invention provides a multilayer ceramic chip capacitor that has a high reliability and satisfies X5R characteristics. As for the multilayer ceramic chip capacitor, change of capacitance with time under direct current electric field is small and the lifetime of insulation resistance is long.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A non-reducible, low temperature sinterable dielectric ceramic composition comprising $BaTiO_3$;

$MgCO_3$: 0.2 to 3.0 mol;

at least one selected from $Y_2O_3$, $Ho_2O_3$, $Dy_2O_3$ and $Yb_2O_3$: 0.05 to 1.5 mol;

$Cr_2O_3$: 0.1 to 1.5 mol;

$Ba_xCa(1-x)SiO_3$ (provided that $0 \leq x \leq 1$): 0.2 to 3.0 mol; and $Mn_2V_2O_7$: 0.01 to 1.5 mol, per 100 mol of $BaTiO_3$.

2. The composition as set forth in claim 1, wherein the $Ba_xCa(1-x)SiO_3$ is added in an amount of 0.2 to 1.4 mol.

3. The composition as set forth in claim 1, wherein in the $Ba_xCa(1-x)SiO_3$, x is 0.3 to 0.6.

4. The composition as set forth in claim 1, wherein the $Mn_2V_2O_7$ is added in an amount of 0.01 to 1.0 mol.

5. The composition as set forth in claim 1, wherein the total amount of the $Ba_xCa(1-x)SiO_3$ and $Mn_2V_2O_7$ is 1 to 1.6 mol.

6. A multilayer ceramic chip capacitor comprising alternately staked, dielectric ceramic layers and internal electrode layers, wherein the dielectric ceramic layers comprise $BaTiO_3$;

$MgCO_3$: 0.2 to 3.0 mol;

at least one selected from $Y_2O_3$, $Ho_2O_3$, $Dy_2O_3$ and $Yb_2O_3$: 0.05 to 1.5 mol;

$Cr_2O_3$: 0.1 to 1.5 mol;

$Ba_xCa(1-x)SiO_3$ (provided that $0 \leq x \leq 1$): 0.2 to 3.0 mol; and $Mn_2V_2O_7$: 0.01 to 1.5 mol, per 100 mol of $BaTiO_3$.

7. The capacitor as set forth in claim 6, wherein the internal electrode layers comprise a conductor selected from Ni and Ni alloys.

8. A method for preparing a multilayer ceramic chip capacitor, comprising the steps of:

calcining MnO and $V_2O_5$ at a temperature of 650 to 800° C. to obtain $Mn_2V_2O_7$ in the form of powder;

mixing $BaTiO_3$, $MgCO_3$: 0.2 to 3.0 mol, at least one selected from $Y_2O_3$, $Ho_2O_3$, $Dy_2O_3$ and $Yb_2O_3$: 0.05 to 1.5 mol, $Cr_2O_3$: 0.1 to 1.5 mol, $Ba_xCa(1-x)SiO_3$ (provided that $0 \leq x \leq 1$): 0.2 to 3.0 mol, and $Mn_2V_2O_7$: 0.01 to 1.5 mol, per 100 mol of $BaTiO_3$, to obtain dielectric material;

alternately stacking the dielectric material and internal electrode to obtain laminated body; and sintering laminated body.

9. The method as set forth in claim 8, wherein the $Ba_xCa(1-x)SiO_3$ is added in an amount of 0.2 to 1.4 mol.

10. The method as set forth in claim 8, wherein the $Mn_2V_2O_7$ is added in an amount of 0.01 to 1.0 mol.

11. The method as set forth in claim 8, wherein the total amount of the $Ba_xCa(1-x)SiO_3$ and $Mn_2V_2O_7$ is 1 to 1.6 mol.

12. The method as set forth in claim 8, wherein the calcining process is carried out at 650 to 680° C.

13. The method as set forth in claim 8, wherein the sintering process is carried out at 1,200 to 1,250° C.

* * * * *